US006755018B2

(12) United States Patent
Jonninen

(10) Patent No.: US 6,755,018 B2
(45) Date of Patent: Jun. 29, 2004

(54) LEAKAGE OIL RETURN APPARATUS FOR A HYDRAULIC MOTOR

(75) Inventor: Markku Jonninen, Lahti (FI)

(73) Assignee: Ideachip Oy, Hollola (FI)

( * ) Notice: Subject to any disclaimer, the term of this patent is extended or adjusted under 35 U.S.C. 154(b) by 85 days.

(21) Appl. No.: 10/204,991

(22) PCT Filed: Feb. 28, 2001

(86) PCT No.: PCT/FI01/00199

§ 371 (c)(1),
(2), (4) Date: Aug. 26, 2002

(87) PCT Pub. No.: WO01/65113

PCT Pub. Date: Sep. 7, 2001

(65) Prior Publication Data

US 2003/0010562 A1 Jan. 16, 2003

(30) Foreign Application Priority Data

Feb. 28, 2000 (FI) ............................................ 20000448

(51) Int. Cl.[7] ................................................ F16D 31/02
(52) U.S. Cl. ............................................... 60/464; 92/80
(58) Field of Search ................................ 60/464; 92/80, 92/86

(56) References Cited

U.S. PATENT DOCUMENTS 4,168,612 A * 9/1979 Nikolaus ..................... 60/447
4,680,931 A * 7/1987 Jacobs ......................... 60/447

FOREIGN PATENT DOCUMENTS

| | | | |
|---|---|---|---|
| DE | 3202192 A1 | 8/1983 | F15B/21/04 |
| DE | 4304403 A1 | 8/1993 | F15B/11/02 |
| EP | 0534067 A2 | 3/1993 | F04B/21/00 |

* cited by examiner

*Primary Examiner*—Edward K. Look
*Assistant Examiner*—Michael Leslie
(74) *Attorney, Agent, or Firm*—Synnestvedt & Lechner LLP

(57) ABSTRACT

The invention relates to a leakage oil return apparatus for a hydraulic motor. The apparatus is used for returning the oil leaked from the working pressure space of a motor (1) into a motor casing (12) from the casing (12) back to a return line (2) of the motor. Consequently, the return pump (5) driven by a shaft (3) of the hydraulic motor (1) has its suction side (7) connected with said casing (12) and its delivery side (6) conencted by way of non-return valves (4) with pressure and return lines (2) of the motor (1) in such a way that flow communication is established always with the line having a lower pressure. It is preferred that the return pump (5) have its delivery side (6) connected by way of a pressure proportional valve (8) with said casing (12). The pressure proportional valve (8) is adapted to receive its control from the pressure ratio between a casing pressure and a pressure in the delivery side (6) of the return pump (5) in such a way that, as the casing pressure goes down below a given pressure limit or approaches the pressure of 0 bar, the pressure proportional valve (8) switches the return pump's (5) volume flow to free circulation i.e. back to the casing (12).

7 Claims, 1 Drawing Sheet

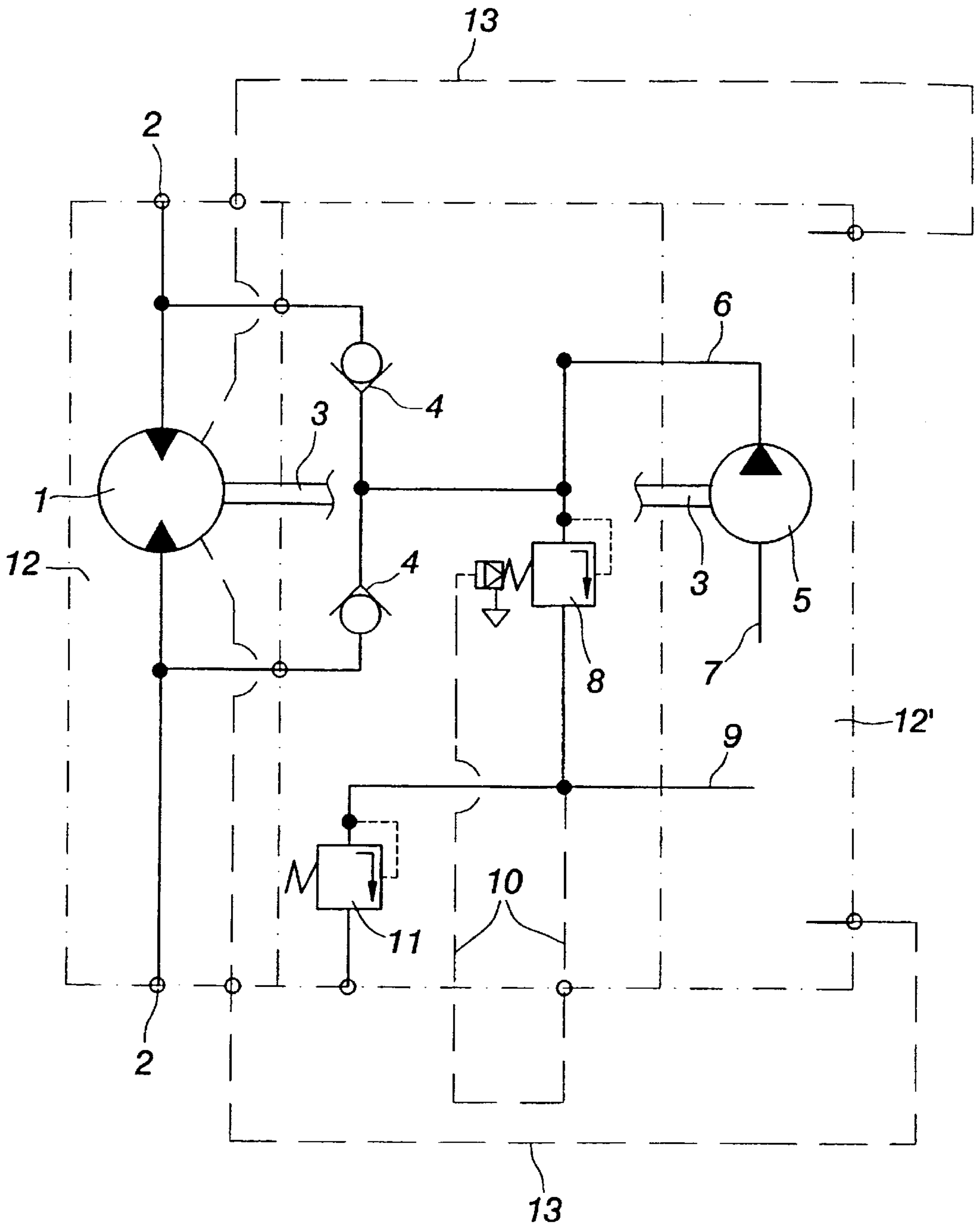
13
2
6
4
3
1
4
12
3
5
8
7
12'
9
10
11
2
13

LEAKAGE OIL RETURN APPARATUS FOR A HYDRAULIC MOTOR

The invention relates to a leakage oil return apparatus for a hydraulic motor for returning the oil leaked from the working pressure space of a motor into a motor casing from the casing back to a return line of the motor.

Pressures existing in the pressure and return lines of sizable hydraulic motors are comparatively high: on the delivery side e.g. 150–350 bar, and even on the return side higher than allowable casing pressures, often up to dozens of bar. Momentarily, even the return line pressure may rise to above 150 bar (e.g. as the running direction is reversed). With such high pressures, it is inevitable that internal leakage occur within a motor from the working pressure space of the motor into the motor casing. This leakage oil is exploited for lubrication duties, but excess oil must be expelled from the casing and returned to circulation. Motors use hydraulic oil for lubrication through lubricating conduits constructed from the delivery side to oiling points. For example, the lubrication of crankshaft and piston-pin bearings can be arranged with internal drain conduits from the delivery side, the motor consequently leaking also through the slide bearing packings of these conduits. For this reason, the sizable hydraulic motors are constructed with a separate drain line for carrying the leakage oil through a tank to circulation. Since the motor can be located at the end of long hoses, the construction of a separate drain line incurs extra costs, in addition to which the casing oils are generally delivered into the tank in unfiltered condition so as not to develop a back pressure in the drain line. The leakage oil carries impurities from the motor into the casing and thence along a drain line into the tank. This, in turn, results in a faster wear of the system, more breakdowns, and a shorter service life for the equipment.

It is an object of the invention to provide a leakage oil return apparatus for a hydraulic motor, which is not hampered by the above problems.

This object is achieved by the invention on the basis of the characterizing features set forth in the appended claim 1. The non-independent claims disclose preferred embodiments of the invention.

The invention will now be described in more detail with reference to the accompanying drawing, which shows a hydraulics chart for an apparatus of the invention.

A hydraulic motor 1 is provided with pressure and return lines 2, which alternate with each other according to which way the motor 1 is run. The motor 1 is provided with a casing represented schematically by a block 12. The motor 1 has its shaft 3 coupled to drive a return pump 5 whose suction side 7 is connected with a casing space 12' of the return pump 5, which is in flow communication with the casing space 12 of the motor 1 by way of flow channels 13. The flow channels 13 can be designed as borings between the casing elements 12 and 12' or, optionally, by using hoses external of the casings. Alternatively, the return pump 5 may be located within the casing 12, in which case only the pressure line 6, along with its valves, must be designed as a boring to a low-pressure line. Since there is a high pressure, e.g. in the order of 100 bar, acting across packings between the moving parts of the motor 1, the working pressure space of the motor 1 leaks oil into the motor casing 12. Oil is also delivered in pressurized condition to slide bearings, from which it seeps partially through the packings into the casing 12. Leakage oil must be continuously drained from the casing 12 in order to prevent the casing pressure from becoming excessively high and from exploding the casing. With regard to structural dimensions, a suitable upper limit for the casing pressure is 3–5 bar On the other hand, the oil seeped into the casing 12 needs to have a little pressure to make the oil capable of penetrating to oiling points, such as bearings.

According to the invention, the pressure of leakage oil prevailing in the casing spaces 12 and 12' can be maintained within a proper range by means of a system to be described hereinafter.

The return pump 5 has its delivery side 6 connected by way of non-return valves 4 with the pressure and return lines 2 of the motor 1, such that a flow communication from the return pump 5 is established with a return line having a lower pressure at any particular time. In addition to this, the delivery side 6 is connected by way of a pressure proportional valve 8 and a flow channel 9 with the casing space 12' of the return pump 5, in which prevails the same pressure as in the casing space 12 since the casing spaces 12' and 12 are in flow communication with each other. The pressure proportional valve 8 is adapted to receive its operating control from the pressure ratio between a casing pressure on the one hand and, on the other hand, a pressure in the delivery side 6 of the return pump 5. The pressure proportional valve 8 has an area ratio which may be e.g. about 20 or about 50, whereby the casing pressure of 0–2 bar corresponds to the pressure of 0–40 bar or 0–100 bar in the pump 5. As the pressure existing within the casings 12 and 12' goes down below a certain pressure value or approaches the pressure of zero bar, the pressure proportional valve 8 switches the volume flow of the return pump 5 to free circulation i.e. back to the casing 12'. As a result of this, the return pump 5 does not drain the casing 12, 12' or aspirate a negative pressure therein, but a certain low oil pressure remains therein. The pressure proportional valve 8 is not necessarily required in a solution developed to allow a more depleted casing 12, 12' or a negative pressure in the casing space. The return pump 5 has a volume flow which is very low, yet higher than a permissible oil leak in the motor 1 (provided that packings are intact). If, e.g. as a result of excessive wearing or damaging of packings, the motor 1 develops an oil leak which exceeds the volume flow of the return pump 5, the pressure begins to rise in the casing spaces 12 and 12' until it reaches a maximum casing pressure value (e.g. 3–5 bar) established by means of a pressure relief valve 11. When it is observed that the pressure relief valve 11 lets oil through, it is time for maintenance and repair of the motor 1. The pressure relief valve 11 may also be functionally adapted to set off an alarm.

The return pump 5 may be of such a type that its flow direction does not change, even if the drive shaft 3 reverses its running direction (e.g. a spring-return piston pump). Another type of pump, such as a gear pump or the like, may be appropriate whereby, in response to a reversal of the running direction, the pump would automatically reverse the pumping direction as well, which should be accounted for in the hydraulics chart. The suction side should be provided with an additional non-return valve for stopping the pumping of leakage oil into the casing.

What is claimed is:

1. A leakage oil return apparatus for a hydraulic motor for returning the oil leaked from a working pressure space of a motor into a motor casing space from the casing space back to a return line of the motor, wherein a return pump driven by a shaft of the motor has a suction side connected with said casing space which is in flow communication therewith and a delivery side connected by way of non-return valves with pressure and return lines of the motor in such a way that flow communication is always established with the lines having a lower pressure.

2. An apparatus according to claim 1, wherein said return pump has its delivery side connected by way of a pressure proportional valve with said casing space the pressure proportional valve being adapted to receive its control from the pressure ratio between a casing pressure and a pressure in the delivery side of the return pump in such a way that, as the casing pressure goes down below a given pressure value or approaches the pressure of 0 bar, the pressure proportional valve switches the volume flow of the return pump to an unloading circuit.

3. An apparatus according to claim 2, wherein the pressure proportional valve has an area ratio which is about 20, the casing pressure of 0 to 2 bar corresponding to the pressure of 0 to 40 bar in the return pump.

4. An apparatus according to claim 2, further comprising a pressure relief valve for limiting a maximum pressure within the casing space to be slightly higher than the casing pressure at which the pressure proportional valve switches the return pump to said unloading circuit.

5. An apparatus according to claim 1, wherein the motor and the return pump have their casing spaces in flow communication with each other and the return pump has its suction side connected with the casing space of the return pump.

6. An apparatus according to claim 2, wherein the pressure proportional valve has an area ratio which is about 50, the casing pressure of 0 to 2 bar corresponding to the pressure of 0 to 100 bar in the return pump.

7. An apparatus according to claim 2, wherein said unloading circuit comprises said casing space.

* * * * *